(12) United States Patent
Immonen et al.

(10) Patent No.: US 9,081,452 B2
(45) Date of Patent: Jul. 14, 2015

(54) METHOD, APPARATUS AND COMPUTER PROGRAM FOR ENABLING REGISTRATION OF USER ACTUATIONS

(71) Applicant: Nokia Corporation, Espoo (FI)

(72) Inventors: Jussi Antero Immonen, Helsinki (FI); Riku Oskari Suomela, Espoo (FI)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 13/680,690

(22) Filed: Nov. 19, 2012

(65) Prior Publication Data

US 2014/0139477 A1    May 22, 2014

(51) Int. Cl.
G06F 3/044    (2006.01)

(52) U.S. Cl.
CPC ........ *G06F 3/044* (2013.01); *G06F 2200/1634* (2013.01)

(58) Field of Classification Search
None
See application file for complete search history.

(56) References Cited

U.S. PATENT DOCUMENTS

| | | | |
|---|---|---|---|
| 6,646,864 B2 | 11/2003 | Richardson | 361/681 |
| 2004/0203502 A1* | 10/2004 | Dietrich et al. | 455/90.3 |
| 2006/0148454 A1* | 7/2006 | Welch | 455/414.1 |
| 2013/0147753 A1* | 6/2013 | Griffin | 345/174 |

FOREIGN PATENT DOCUMENTS

EP    1 583 251 A1    10/2005

OTHER PUBLICATIONS

"Cypress TrueTough® Touchscreen Solution Drives "Floating Touch" Navigation Feature in New Xperia™ sola Smartphone from Sony Mobile Communications", © 2012 Cypress Semiconductor Corp., 1 pg.
Woolford, T.J., "DriSuit: Waterproof iPhone Case has Underwater Touchscreen", Feb. 9, 2012, 3 pgs.
"Five Ways for Protecting Your Cell Phone Against Water Damage", Nov. 23, 2010, 2 pgs.

* cited by examiner

*Primary Examiner* — Gerald Johnson
*Assistant Examiner* — Christopher Kohlman
(74) *Attorney, Agent, or Firm* — Harrington & Smith (57) ABSTRACT

A method, apparatus and computer program wherein the method includes determining that a cover is positioned overlaying a capacitive touch pad; and adjusting, in response to the determining, a threshold input at which user actuation of the capacitive touch pad is registered.

22 Claims, 7 Drawing Sheets

METHOD, APPARATUS AND COMPUTER PROGRAM FOR ENABLING REGISTRATION OF USER ACTUATIONS

TECHNOLOGICAL FIELD

Examples of the present disclosure relate to a method, apparatus and computer program for enabling registration of user actuations. In particular, they relate to a method, apparatus and computer program for enabling registration of user actuations of a capacitive touch pad.

BACKGROUND

Apparatus which use touch pads such as capacitive touch pads to enable user inputs are known. A user may be able to actuate such a touch pad by bringing an object such as their finger close to the surface of the touch pad or touching the touch pad.

Touch pads such as capacitive touch pads may be difficult to operate if a cover is provided overlaying the touchpad or even impossible if the cover is thick enough. For example a user may put an apparatus in a protective casing, for instance, if they want to use an apparatus underwater they may use a waterproof casing.

It would be useful to provide a touch pad such as a capacitive touch pad which can be actuated even when a cover is provided overlaying the touchpad.

BRIEF SUMMARY

According to various, but not necessarily all, examples of the disclosure there is provided a method comprising: determining that a cover is positioned overlaying a capacitive touch pad; and adjusting, in response to the determining, a threshold input at which user actuation of the capacitive touch pad is registered.

In some examples the cover may be a temporary cover.

In some examples the cover may be configured to be removably positioned overlaying the capacitive touch pad by a user.

In some examples determining that a cover is positioned overlaying a capacitive touch pad may comprise obtaining data from the cover. The data may be obtained via a wireless connection. The data may be obtained via a near field communication connection. The data may be obtained via a physical connection.

In some examples determining that a cover is positioned overlaying a capacitive touch pad may comprise detecting inputs within a predetermined range.

In some examples adjusting the threshold input may comprise changing a threshold capacitance from a first capacitance to a second capacitance where the second capacitance is lower than the first capacitance. The second capacitance may be determined using calibration measurements. The second capacitance may be determined using data obtained from the cover.

In some examples the cover may form a protective casing around an apparatus.

In some examples the method may also comprise determining that the cover has been removed from the position overlaying the capacitive touch pad and adjusting, in response to determining that the cover has been removed, the threshold input back to the threshold which was used before the cover was attached.

In some examples the cover may overlay a plurality of capacitive touch pads and the threshold input may be adjusted for each of the plurality of capacitive touch pads.

According to various, but not necessarily all, examples of the disclosure there is provided an apparatus comprising: at least one processor; and at least one memory including computer program code; the at least one memory and the computer program code configured to, with the at least one processor, cause the apparatus at least to perform; determining that a cover is positioned overlaying a capacitive touch pad; and adjusting, in response to the determining, a threshold input at which user actuation of the capacitive touch pad is registered.

In some examples the cover may be a temporary cover.

In some examples the apparatus may be configured to enable the cover to be removably positioned overlaying the capacitive touch pad by a user.

In some examples the at least one memory and the computer program code may be configured to, with the at least one processor, cause the apparatus to determine that a cover is positioned overlaying a capacitive touch pad by obtaining data from the cover.

In some examples the apparatus may be configured to obtain the data via a wireless connection. The apparatus may be configured to obtain the data via a near field communication connection.

In some examples the apparatus may be configured to obtain the data via a physical connection.

In some examples the at least one memory and the computer program code may be configured to, with the at least one processor, cause the apparatus to determine that a cover is positioned overlaying a capacitive touch pad by detecting inputs within a predetermined range.

In some examples the at least one memory and the computer program code may be configured to, with the at least one processor, cause the apparatus to adjust the threshold input by changing a threshold capacitance from a first capacitance to second capacitance where the second capacitance is lower than the first capacitance. The second capacitance may be determined using calibration measurements. The second capacitance may be determined using data obtained from the cover.

In some examples the cover may be configured to form a protective casing around an apparatus.

In some examples the at least one memory and the computer program code may be configured to, with the at least one processor, cause the apparatus to determine that the cover has been removed from the position overlaying the capacitive touch pad and adjust, in response to determining that the cover has been removed, the threshold input back to the threshold which was used before the cover was attached.

In some examples the cover may overlay a plurality of capacitive touch pads and the threshold input is adjusted for each of the plurality of capacitive touch pads.

According to various, but not necessarily all, examples of the disclosure there is provided a computer program comprising computer program instructions that, when executed by at least one processor, enable: determining that a cover is positioned overlaying a capacitive touch pad; and adjusting, in response to the determining, a threshold input at which user actuation of the capacitive touch pad is registered.

According to various, but not necessarily all, examples of the disclosure there is provided a computer program comprising program instructions for causing a computer to perform a method as described above.

According to various, but not necessarily all, examples of the disclosure there is provided a physical entity embodying a computer program as described above.

According to various, but not necessarily all, examples of the disclosure there is provided an electromagnetic carrier signal carrying a computer program as described above.

The apparatus may be for wireless communication.

BRIEF DESCRIPTION

For a better understanding of various examples that are useful for understanding the detailed description, reference will now be made by way of example only to the accompanying drawings in which.

DETAILED DESCRIPTION

The Figures illustrate a method, apparatus 1 and computer program 9. The method comprises: determining that a cover 25 is positioned overlaying a capacitive touch pad 15; and adjusting, in response to the determining, a threshold input at which user actuation of the capacitive touch pad 15 is registered.

Figure 1:
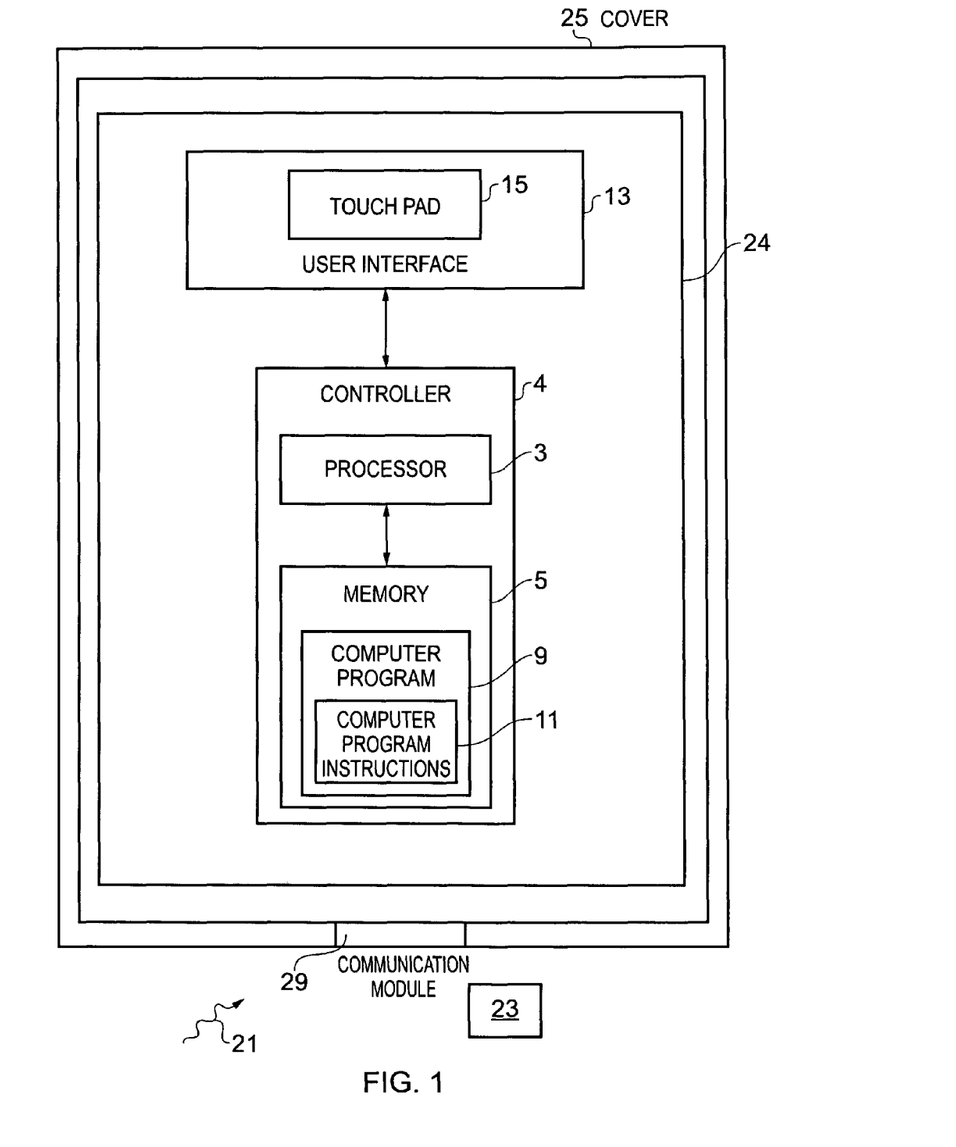
FIG. 1 schematically illustrates an apparatus according to an example of the disclosure.

FIG. 1 schematically illustrates an apparatus 1 according to an example of the disclosure. The apparatus 1 may be an electronic apparatus. The apparatus 1 may be, for example, a mobile cellular telephone, a personal computer, a camera, a gaming device, a personal digital assistant, an electronic book reader, a personal music player, a tablet computer or any other similar apparatus which may comprise a touch pad and which may be used with a cover 25. The apparatus 1 may be a handheld apparatus 1 which can be carried in a user's hand, handbag or pocket of their clothing for example.

Features referred to in the following description are illustrated in FIG. 1.

Figure 2:
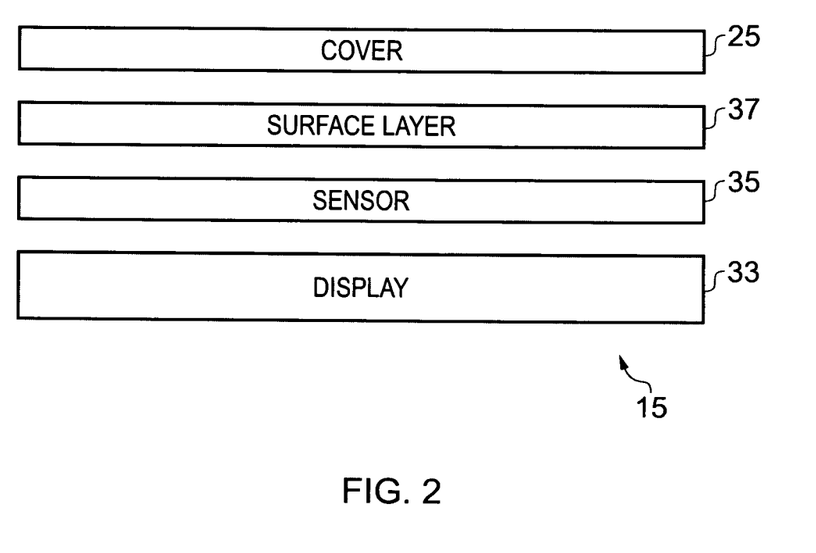
FIG. 2 schematically illustrates a touch pad according to an example of the disclosure.

The example apparatus 1 illustrated in FIG. 1 comprises: a user interface 13 and a controller 4. In the example of FIG. 1 the controller 4 comprises at least one processor 3 and at least one memory 5 and the user interface 13 comprises a touch pad 15. The touch pad 15 may be a capacitive touch pad 15. In some examples, the touch pad 15 may be part of a touch sensitive display 31. An example of a touch sensitive display is illustrated in FIG. 2. In other examples the touch pad 15 may be provided on other portions of the apparatus 1.

It is to be appreciated that the apparatus 1 may comprise additional features that are not illustrated. For example, in examples of the disclosure where the apparatus 1 is a mobile cellular telephone or other communications device, the apparatus 1 may also comprise one or more transmitters and/or receivers configured to enable communication or wireless communication. Similarly in examples of the disclosure where the apparatus 1 is a camera the apparatus 1 may comprise an image capturing module configured to enable the apparatus 1 to capture images.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc.) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet. Similarly in examples where the apparatus 1 comprises a camera the controller may be configured to control an image capturing module and enable captured images to be captured and stored and/or processed.

The controller 4 may also be configured to enable the apparatus 1 to determine that a cover 25 is positioned overlaying a capacitive touch pad 15; and adjust, in response to the determining, a threshold input at which user actuation of the capacitive touch pad 15 is registered.

The at least one processor 3 is configured to read from and write to the at least one memory 5. The at least one processor 3 may also comprise an output interface via which data and/or commands are output by the at least one processor 3 and an input interface via which data and/or commands are input to the at least one processor 3.

The memory 5 may be configured to store a computer program 9 comprising computer program instructions (computer program code) 11 that controls the operation of the apparatus 1 when loaded into the at least one processor 3. The computer program instructions 11, of the computer program 9, may provide the logic and routines that enables the apparatus 1 to perform the methods illustrated in FIGS. 4 to 7. The at least one processor 3 by reading the memory 5 is able to load and execute the computer program 9.

The apparatus therefore comprises: at least one processor 3; and at least one memory 5 including computer program code 11, the at least one memory 5 and the computer program code 11 configured to, with the at least one processor 3, cause the apparatus 1 at least to perform: determining that a cover 25 is positioned overlaying a capacitive touch pad 15; and adjusting, in response to the determining, a threshold input at which user actuation of the capacitive touch pad 15 is registered.

The computer program 9 may arrive at the apparatus 1 via any suitable delivery mechanism. The delivery mechanism may be, for example, a non-transitory computer-readable storage medium 23, a computer program product, a memory device, a record medium such as a compact disc read-only memory (CD-ROM) or digital versatile disc (DVD), an article of manufacture that tangibly embodies the computer program 9 or any other suitable mechanism. The delivery mechanism may be a signal 21 configured to reliably transfer the computer program 9. The apparatus 1 may propagate or transmit the computer program 9 as a computer data signal.

Although the memory 5 is illustrated as a single component it may be implemented as one or more separate components some or all of which may be integrated/removable and/or may provide permanent/semi-permanent/dynamic/cached storage.

Although the processor 3 is illustrated as a single component it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device."

The apparatus 1 of FIG. 1 comprises a housing 24. The housing 24 may form an outer surface of the apparatus 1 which the user touches when they are holding the apparatus 1. The components of the apparatus 1 may be contained within the housing 24. For example, the controller 4 and memory 5 may be contained within the housing. Some components, such as the touch pad 15 may be partially contained within the housing 24 so that part of the touch pad 15 forms a portion of the outer surface of the apparatus 1. For example the touch pad 15 may be provided on any portion of the housing 24. In some examples the touch pad 15 may be provided all around the apparatus 1. This may enable a user to touch a part of the touch pad 15 when they are using the apparatus 1.

In the example of FIG. 1 a cover 25 is provided. The cover 25 may extend around the housing 24 of the apparatus 1. In some examples the cover 25 may completely surround the apparatus 1 so that the apparatus 1 may be entirely contained within the casing 25. In such examples, when the cover 25 is in place, a user might not be able to directly touch the housing 24 of the apparatus 1. In some examples the cover 25 may extend over only a portion of the apparatus 1. For example, the cover 25 may be provided overlaying components such as a display. In such examples, one or more portions of the housing 24 of the apparatus 1 can still be touched by the user of the apparatus 1 even when the cover 25 is in place.

The cover 25 may be positioned so that at least a portion of the cover 25 overlays the touch pad 15.

In some examples the cover 25 may be a temporary cover 25. This may enable the cover to be removed so that a user may use the apparatus 1 either with the cover 25 in place or without the cover 25. In some examples the cover 25 may be configured to be removably positioned around the apparatus 1 by a user so that the user can easily add or remove the cover 25. For example, the cover 25 may comprise a cavity into which the user may place or remove the apparatus 1.

The cover may be configured to protect the apparatus 1. For example, the cover 25 may be configured to protect the apparatus 1 so that the apparatus 1 could be used in rough conditions without being damaged. For example the cover may provide a watertight seal which may protect the apparatus 1 from fluid ingress. In such examples the cover 25 may enable the apparatus 1 to be positioned underwater without being damaged. In other examples the cover 25 may be configured to protect the apparatus from impacts. In some examples the cover may be provided to protect the apparatus from dirt. In some examples the cover 25 may be configured to provide an aesthetic or personalised cover for the apparatus 1.

In some examples the cover 25 may be rigid or may comprise rigid portions. For example the cover 25 may be configured so that it doesn't bend or deform when a user touches and/or presses on the surface of the cover 25. The portion of the cover 25 which overlays the touch pad 15 may be rigid so that when the user touches this portion of the cover 25 there is no change in the distance between the surface of the cover 25 and the surface of the touch pad 15. It is to be appreciated that in other embodiments the cover 25 may be flexible or may comprise flexible portions.

In some examples the cover 25 may comprise a communications module 29. The communications module 29 may be incorporated as a single module or a plurality of different modules. The communications module 29 may provide any means which may enable the cover 25 to store information and enable the information to be provided to the apparatus 1. For example the communications module 29 may comprise an RFID (radio frequency identification) chip or USB (universal serial bus) connection or any other suitable means.

The information stored by the cover 25 may comprise information indicating how the cover 25 affects the response of the touch pad 15 when the user touches the surface of the cover 25 rather than the surface of the touch pad 15. In some examples the information may comprise information such as the thickness and permittivity of the cover 25. In some examples the information may comprise previous measurements of the change in the response.

In the example apparatus 1 illustrated in FIG. 1 the user interface 13 comprises a touch pad 15. The touch pad 15 may comprise any means which may enable a user to make an input into the apparatus 1. The touch pad 15 may comprise means which enables a user of the apparatus 1 to input information into the apparatus 1. The information may be used to control the apparatus 1. A user may actuate the touch pad 15 by touching the surface of the touch pad 15 with an object or bringing an object into proximity of the surface of the touch pad 15. In some examples a user may activate a touch pad 15 using a hovering input. The hovering input may comprise a user bringing an object close to, but not touching, a touch pad 15. The distance between the object and the touch pad 15 may depend on the sensitivity of the touch pad 15 and other parameters. In some examples a user may actuate a touch pad 15 by bringing an object within several centimeters (around 10) of a touch pad 15.

In some examples of the disclosure the touch pad 15 may be part of touch sensitive display 31. An example touch sensitive display 31 is illustrated schematically in FIG. 2. The example touch sensitive display 31 of FIG. 2 comprises a display 33, a sensor 35 and a surface layer 37. It is to be appreciated that in other embodiments of the disclosure the touch sensitive display 31 may comprise other components.

The display 33 may comprise any means which enables information to be displayed to a user of the apparatus 1. The information may correspond to information which has been input by the user via the touch pad 15 or other user input devices, information which is stored in the one or more memories 5 or information which has been received by apparatus 1 or any other suitable information.

The display 33 may comprise any suitable display such as a liquid crystal display, light emitting diode, thin film transistor or any other suitable type of display.

The sensor 35 may be positioned overlaying the display 33. The sensor 35 may comprise any means which may be configured to detect when a user actuates the touch pad 15 with an object. A user may actuate the touch pad by touching a surface of the touch pad or by bringing an object close to the surface of the touch pad 15 even if the object does not touch the surface of the touch pad 15. In examples of the disclosure the sensor 35 may be configured to detect an actuation even when there is an object, such as a cover 25, between the user and the touch pad 15.

In some embodiments of the disclosure the sensor 35 may comprise one or more capacitive sensors. The capacitive sensor 35 may comprise a layer of capacitive material. In some embodiments of the disclosure the capacitive material may be arranged in a grid or other suitable array. The capacitive material may be transparent to enable the display 33 to be visible though the sensor 35. The capacitive material may comprise a material such as indium tin oxide or any other suitable material.

The capacitive material may be configured so that a user can actuate the capacitive sensor 35 by touching the surface of the touch pad 15 or bringing an object, such as their finger or part of their hand, close to the surface of the touch pad 15. This actuation causes charge to be sourced or sunk by the capacitive sensor 35 which changes the capacitance of the sensor 35. This enables the actuation to be detected and may enable the sensor 35 to provide an output signal indicative of the change in the capacitance. In some examples the output signal may be analysed to obtain information about the actuations such as the location and duration or any other suitable information.

The output signal of the capacitive sensor 35 may be provided as an input to the processor 3. The output signal provided by the capacitive sensor 35 may have a magnitude. The magnitude of the output signal may provide an indication of the size of the change in the capacitance of the capacitive material when the touch pad 15 has been actuated. The output signal of the capacitive sensor 35 may also provide an indication of the location of the area of the touch pad 15 which has been actuated.

The processor 3 may be configured only to register a user actuation of the touch pad 15 if the input is above a threshold. For example, if the change in capacitance of the touch pad 15 is above a threshold then the processor 3 will register this as a user input. If the change in capacitance of the touch pad 15 is below the threshold then the processor 3 can ignore the signal. In the latter case the change in capacitance could have been caused unintentionally.

In the example embodiment of FIG. 2 a surface layer 37 is provided overlaying the sensor 35 and display 33. The surface layer 37 may provide a surface which the user of the apparatus 1 can touch to actuate the touch pad 15.

In some embodiments of the disclosure the surface layer 37 may form part of a housing 24 of the apparatus 1. The surface layer 37 may form part of the outer surface of the apparatus 1.

The surface layer 37 may be transparent so that the display 33 is visible through the surface layer 37. The surface layer 37 may comprise an electrically insulating material.

In examples of the disclosure, when the cover 25 is in place at least a portion of the cover 25 overlays the touch pad 15. This may prevent a user from directly touching the surface layer 37 of the touch pad 15. The cover 25 acts as a barrier between the user and the touch pad 15. The cover 25 may act as a further insulating layer between the user and the capacitive sensor 35. This effectively increases the separation between the user and the capacitive sensor 35 compared to the separation if the user touched the surface layer 37 directly. This may result in a smaller change in the capacitance of the sensor 35 than if the user touched the surface layer 37 of the touch pad directly. Similarly if the touch pad 15 is configured to detect hovering inputs then the cover 25 may cause a smaller change in the capacitance of the sensor 35 to be detected. Therefore when the cover 25 is in place the signal which is provided to the processor 3 may be below the threshold which is needed to register a user actuation.

FIG. 2 illustrates a touch sensitive display 31. It is to be appreciated that a touch pad 15 could be provided in other parts of the housing 24 of the apparatus 1. Such touch pads 15 may be provided instead of or in addition to a touch sensitive display 31 and may comprise one or more capacitive sensors 35 as described above.

The methods described below in reference to FIGS. 4 to 7 provide examples which may be used to enable a user to actuate the touch pad 15 even when the cover 25 is positioned overlaying the touch pad 15.

Figure 3:
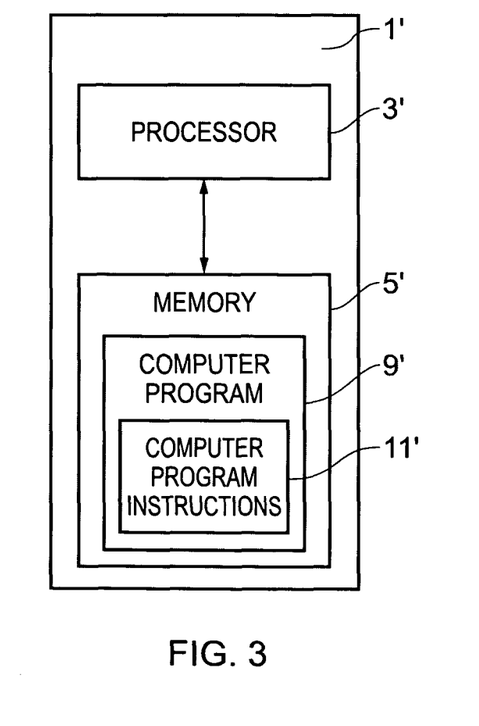
FIG. 3 schematically illustrates another apparatus according to an example of the disclosure.

FIG. 3 illustrates an apparatus 1' according to another embodiment of the disclosure. The apparatus 1' illustrated in FIG. 3 may be a chip or a chip-set. The apparatus 1' comprises at least one processor 3 and at least one memory 5 as described above in relation to FIG. 1. The apparatus 1' may be contained within a housing 24 comprising one or more touch pads 15.

Figure 4:
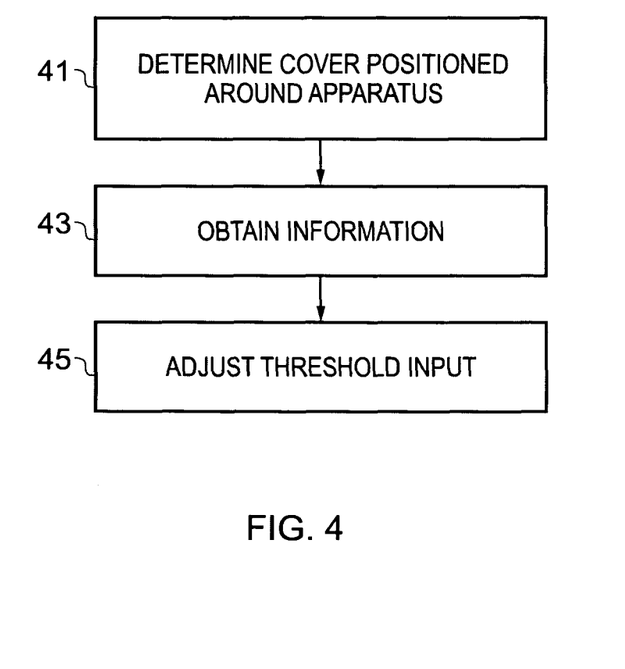
FIG. 4 schematically illustrates a method according to an example of the disclosure.

FIG. 4 illustrates a method according to an example of the disclosure. The method may be implemented using the apparatus 1 and touch pads 15 of FIGS. 1 to 3.

The method of FIG. 4 may enable the apparatus 1 to determine the effect that the cover 25 has when the user is trying to actuate the touch pad 15. The method of FIG. 4 may enable the apparatus 1 to determine the decrease in the change of the capacitance which arises when the user touches the cover 25 rather than the surface layer 37 of the touch pad 15. In other embodiments the apparatus 1 may determine the decrease in the change of the capacitance for hovering inputs where the user does not need to physically touch the apparatus 1.

At block 41 the cover is positioned around the apparatus 1. For example, the apparatus 1 may be removably inserted into a cavity of a cover 25 or arranged in any other suitable way.

The controller 4 of the apparatus 1 may determine that the cover 25 is positioned around the apparatus 1. In some examples the apparatus 1 may determine that at least a portion of the cover 25 is overlaying the touch pad 15.

In some examples the apparatus 1 may be configured to detect the cover 25 using a wireless communication means. For example, the cover 25 may comprise a chip such as an RFID chip or NFC chip which the apparatus 1 may be configured to detect when the cover 25 is positioned around the apparatus 1. The RFID chip or NFC chip may comprise part of a communication module 29.

In other examples the apparatus 1 may be configured to detect the cover 25 using a physical connection. For example, the cover 25 may comprise one or more projecting portions. The one or more projecting portions may be configured to be inserted into sockets of the apparatus 1. For example the projecting portions may be configured to fit into sockets such as USB sockets, charger sockets or a headphone socket or any other suitable socket. The apparatus 1 may be configured to detect when a projecting portion is located in a socket and so determine that the cover 25 is positioned around the apparatus 1. In such examples the projections may also provide a seal for the socket and prevent the ingress of fluid or dirt into the socket.

At block 43 the cover 25 provides information to the apparatus 1. The information which is provided may enable the apparatus 1 to determine the decrease in the change of the capacitance which will arise when the user touches the cover 25 rather than the surface layer 37 of the touch pad 15 and/or makes a hover input with the cover 25 in position. In some examples the information which is provided may comprise information regarding physical properties of the cover 25. For example, the information may comprise the thickness of the cover 25 or the permittivity of the cover 25. In some examples the information may comprise a link or address from which the apparatus 1 may be able to retrieve the information relating to the cover 25.

At block 45 the apparatus 1 determines the effect that the cover 25 has on the capacitance which will be detected by the sensor 35 and adjusts the threshold input at which user actuation is registered. The apparatus 1 may use the information obtained at block 43 to determine the new threshold capacitance.

The new threshold capacitance may be lower than the previous threshold capacitance. Therefore after the cover 25 has been positioned overlaying the touchpad 15 the processor 3 may register smaller changes in capacitance of the sensor 35 as a user input.

Information regarding the new threshold capacitance may be stored in the one or more memories 5 of the apparatus 1. In some examples information regarding the new threshold capacitance may be provided to the cover 25 and stored in the communication module 29 of the cover 25.

Figure 5:
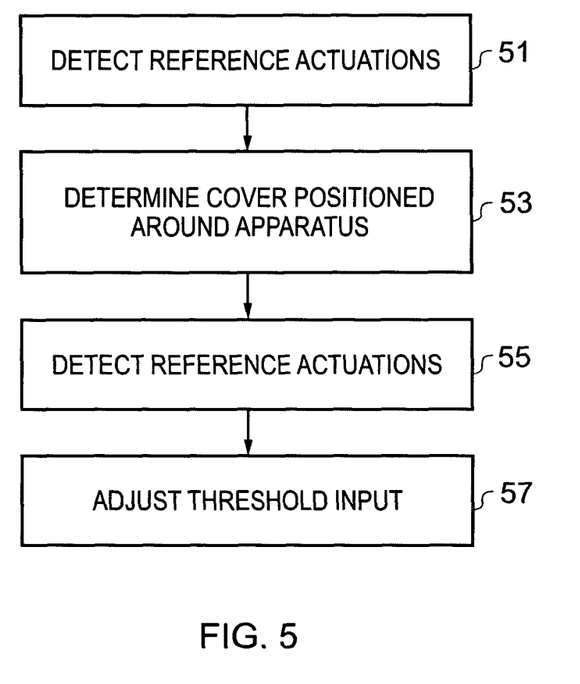
FIG. 5 schematically illustrates a method according to another example of the disclosure.

FIG. 5 illustrates a method according to another example of the disclosure. The method may also be implemented using the apparatus 1 and touch pads 15 of FIGS. 1 to 3.

The method of FIG. 5 may provide another method which enables the apparatus 1 to determine the effect that the cover 25 has when the user is trying to actuate the touch pad 15. As mentioned above a user can actuate a touch pad 15 by touching the touch pad 15 and/or making a hover input.

At block 51 the apparatus 1 detects a first set of reference actuations which are made by the user of the apparatus 1. The reference actuations may be made without the cover 25 being positioned overlaying the touch pad 15. This may enable the user to touch the housing 24 of the apparatus and the surface layer 37 of the touch pad 15 directly.

The reference actuations may be made in response to an indication provided by the apparatus 1. The apparatus 1 may indicate a plurality of different points of the apparatus 1 for the user to actuate. The indications may be provided visually, for example, a series of instructions may be displayed on a display 15.

The reference actuations may comprise the user touching a series of reference points of the apparatus 1. When the user touches each of the reference points the apparatus 1 can measure the capacitance which is detected by the sensor 35. The measured capacitance may be stored for use as a reference measurement. In some examples the reference actuations may comprise a hovering input.

The reference points which the user actuates may comprise one or more points of a touch sensitive display 31. The reference points may also comprise one or more points outside the display such as inputs and/or other points located on the side of the apparatus 1.

At block 53 the cover is positioned around the apparatus 1. In some examples the apparatus 1 may provide an instruction to the user to arrange the cover 25 around the apparatus 1. For example a notification may be displayed on a display that the reference actuations have been completed and the user can now position the cover 25 around the apparatus 1. The apparatus 1 may determine that the cover is positioned around the apparatus 1 as described above in relation to FIG. 4.

At block 55 the apparatus 1 detects a second set of reference actuations which are made by the user of the apparatus 1. The second set of reference actuations are made with the cover 25 overlaying the touch pad 15. The cover 25 may prevent the user from touching the housing 24 of the apparatus 1 and the surface layer 37 of the touch pad 15 directly.

As with the first set of reference actuations the second set of reference actuations may be made in response to an indication provided by the apparatus 1. The apparatus 1 may indicate a plurality of different points of the apparatus 1 for the user to actuate. The reference points which are used to make the second set of reference actuations may be the same or similar to the reference points which were used to make the first set of reference measurements. This may allow for a direct comparison between the two detected capacitance levels.

As at block 51 when the user actuates the respective points of the apparatus 1 the apparatus 1 can measure the change in capacitance which is detected by the capacitance sensor 35.

At block 57 the apparatus 1 determines the effect that the cover 25 has on the capacitance which will be detected by the sensor 35 and adjusts the threshold input at which user actuation is registered.

The apparatus 1 may determine a new threshold capacitance by comparing the first set or reference measurements to the second set of reference measurements. For example, the decrease in the capacitance may be determined by subtracting the capacitance measured in the second set of reference measurements from the capacitance measured in the first set of reference measurements.

In some examples the difference in the respective measurements may be used to determine other properties such as the thickness of the cover 25.

As the cover 25 increases the distance between the user and the touch pad 15 the new threshold capacitance may be lower than the previous threshold capacitance so that after the cover 25 has been positioned overlaying the touch pad 15 the processor 3 may register smaller changes in capacitance of the sensor 35 as a user input.

As described above in relation to FIG. 4 information regarding the new threshold capacitance may be stored in the one or more memories 5 of the apparatus 1. In some examples information regarding the new threshold capacitance may be provided to the cover 25 and stored in the communication module 29 of the cover 25.

Figure 6:
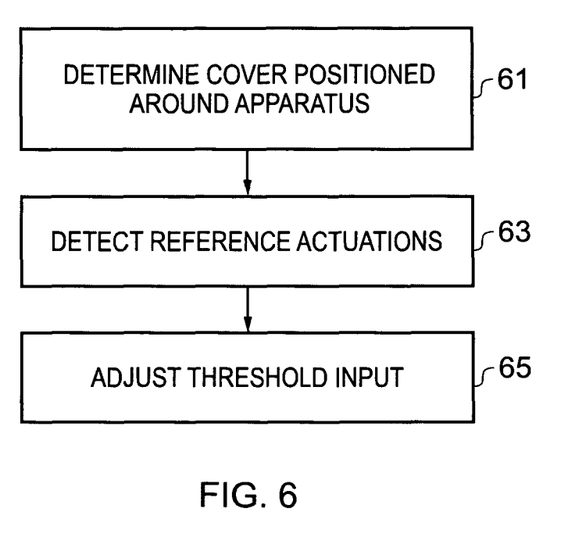
FIG. 6 schematically illustrates a method according to a further example of the disclosure.

FIG. 6 illustrates a method according to a further example of the disclosure. The method of FIG. 6 may also be implemented using the apparatus 1 and touch pads 15 of FIGS. 1 to 3.

The method of FIG. 6 may provide another method which enables the apparatus 1 to determine the effect that the cover 25 has when the user is trying to actuate the touch pad 15. The method of FIG. 6 may be similar to the method of FIG. 5 except that it only requires the user to make one set of reference measurements. This may be more convenient for the user and may make the apparatus 1 easier and quicker to use.

At block 61 the cover is positioned around the apparatus 1. In some examples the apparatus 1 may provide an instruction to the user to arrange the cover 25 around the apparatus 1. The apparatus 1 may detect that the cover 25 is positioned around the apparatus as described above in relation to FIG. 4.

At block 63 the processor 3 detects a set of reference actuations which are made by the user of the apparatus 1. The reference actuations may be made with the cover 25 being positioned overlaying the touch pad 15 so that the user cannot touch the housing 24 of the apparatus 1 or the surface layer 37 of the touch pad 15 directly.

The reference actuations may be made in response to an indication provided by the apparatus 1. The apparatus 1 may indicate a plurality of different reference points of the apparatus 1 for the user to actuate. When the user actuates each of the plurality of reference points the apparatus 1 can measure the change in capacitance which is detected by the capacitance sensor 35. The measured change in capacitance may be stored for use as a reference measurement.

The reference points which the user actuates may comprise one or more points of a touch sensitive display 31. The reference points may also comprise points outside the display such as inputs located on the side of the apparatus 1.

At block 65 the apparatus 1 may determine the effect that the cover 25 has on the capacitance which will be detected by the sensor 35 and may adjust the threshold input at which user actuation is registered.

The apparatus 1 may determine the effect of the cover 25 by using the reference measurements made at block 63. The apparatus 1 may determine the effect of the cover by computing an average capacitance from the reference measurements made at block 63. The average may be the mean or median or mode or any other suitable value. The effect of the cover may be obtained by applying any suitable algorithm to the reference measurements made at block 63.

The methods of FIGS. 4 to 6 indicate methods which may be used to calibrate the touch pad of an apparatus 1 with a temporary or removable cover 25. Once the touch pad 15 has been calibrated the user may use the apparatus 1 as normal but with the adjusted threshold input for the touch pad 15. If the user removes the cover 25 the apparatus 1 may be configured to determine that the cover has been removed. In response to determining that the cover 25 has been removed the apparatus 1 may be configured to adjust the threshold input back to the original threshold which was used before the cover 25 was attached.

In some examples, once the apparatus 1 has been calibrated the new threshold input levels may be stored so that when the cover 25 is re-attached the apparatus 1 can retrieve the new threshold levels without having to repeat the calibration methods of FIGS. 4 to 6. The information indicative of the new threshold input levels may be stored in the memory 5 of the apparatus 1 and/or the communication module 29 of the cover 25.

Figure 7:
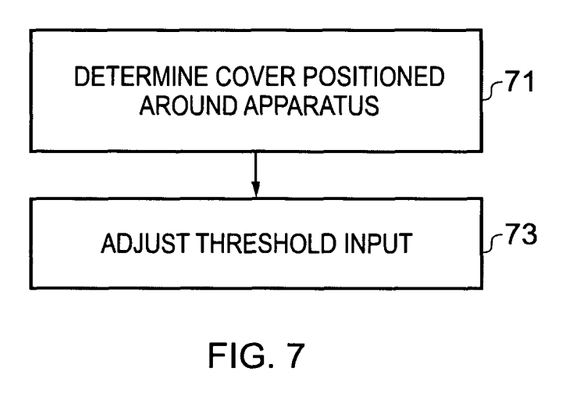
FIG. 7 schematically illustrates a method of adjusting a threshold according to an example of the disclosure.

FIG. 7 illustrates a method of attaching a cover 25 to an apparatus 1 according an example of the disclosure in which the new threshold input levels have been stored previously.

The method of FIG. 7 may be implemented using the apparatus 1 as illustrated in FIGS. 1 to 3 and described above.

At block 71 the apparatus 1 determines that a cover 25 is positioned around the apparatus 1. The cover 25 may be positioned so that at least a portion of the cover 25 is provided overlaying the touch pad 15.

In some examples the apparatus 1 may determine that a cover 25 is in position by obtaining data from the cover 25. The data may be obtained from the cover 25 via a wireless communication connection. The wireless communication connection may comprise, for example, an NFC communication connection or an RFID communication connection or any other suitable connection.

In some embodiments the data may be obtained via a physical communication connection. For example, the cover 25 may comprise one or more projecting portions. The one or more projecting portions may be configured so that when the cover 25 is arranged around the apparatus 1 the projecting portions are inserted into sockets of the apparatus 1. For example the projecting portions may be configured to fit into sockets such as USB sockets, charger sockets or a headphone socket or any other suitable socket. The apparatus 1 may be configured to detect when a projecting portion is located in a socket and so determine that the cover 25 is positioned around the apparatus 1. In such examples the projections may also provide a seal for the socket and prevent the ingress of fluid or dirt into the socket.

In some examples the apparatus 1 may determine that a cover 25 is positioned overlaying the touch pad 15 by monitoring outputs from the touch pad 15. If a plurality of inputs are detected which are consistently lower than the threshold input then it may be determined that a cover 25 or other barrier is located between the touch pad 15 and the user. In some examples the apparatus 1 may detect that lower inputs are provided for touch pads 15 provided all around the apparatus 1. In some examples the apparatus 1 may detect that the input is lower for hovering inputs.

The apparatus 1 may be able to monitor outputs from the touch pad 15 to distinguish between a user actuating the touch pad 15 through a cover 25 and other types of inputs (for example a user making hovering inputs in which the user does not actually touch the surface layer 37 of the touch pad 15 but instead brings their finger within a few millimeters or centimeters of the surface layer 37 of the touch pad 15) or the user wearing gloves (which are not rigid and so deform when they are pressed). If the cover 25 is rigid then the increase in separation between the user's finger and the surface layer 37 of the touch pad 15 will be consistent. The change in the detected capacitance would also be consistent and so a plurality of inputs which are consistently lower than the threshold input but within a predetermined range of each other this may indicate that a rigid barrier, such as a cover 25, is positioned between the user and the surface layer 37 of the touch pad 15. This can be distinguished from the situation where the user is making hover inputs or wearing gloves because in such circumstances the distance between the user and the surface layer 37 of the touch pad 15 would not be consistent for every input. This would cause inconsistency in the capacitance level which is detected by the capacitance sensor 35. Therefore if there is no variation or very little variation in the capacitance level which is detected by the capacitance sensor 35 then the apparatus 1 can infer that the cover 25 is provided overlaying the touch pad 15.

At block 73, in response to determining that the cover 25 is overlaying the touch pad 15 the processor 3 is configured to control the apparatus 1 to change the threshold input at which user actuation is registered. Adjusting the threshold input level may comprise changing a threshold capacitance from a first capacitance to a second capacitance where the second capacitance is lower than the first capacitance.

The apparatus 1 may adjust the threshold input level by obtaining information indicative of the new threshold level. The information may be stored in the memory 5 of the apparatus 1 or may be obtained from the cover 25. The information may have been obtained previously using a method such as the methods of any of FIGS. 4 to 6.

In some embodiments the method may also comprise detecting when the cover 25 has been removed. Once the cover has been removed the threshold input level may be adjusted back to the original level. This may prevent false or unintentional actuation of the touch pad 15.

Examples of the disclosure provide for an apparatus 1 which may be used with a cover 25 overlaying the touch pad 15. The various methods of the disclosure may be used to determine how the sensitivity of the touch pad 15 should be adjusted. Once it has been determined how the sensitivity of the touch pad 15 should be adjusted the processor 3 can be configured to be responsive to the touch pad 15 with the adjusted sensitivity. As the apparatus 1 may determine how the sensitivity should be adjusted the same apparatus 1 may be used with different covers 25. This may enable covers 25 of different thickness and material to be used with the same apparatus 1. This may be useful if a user needs different covers to protect their apparatus 1 in different environments, for example, in some environments a user may wish to protect their apparatus 1 from dirt and in other environments they may wish to provide a completely waterproof cover 25.

Also, in the examples of the disclosure, the cover 25 does not need to have any moving parts to enable a user input. This may make the cover 25 cheaper and easier to make. This may also make the cover 25 more effective at protecting the apparatus 1 from the fluid and dirt.

The blocks illustrated in the FIGS. 4 to 7 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

Although examples of the present disclosure have been described in the preceding paragraphs with reference to various examples, it should be appreciated that modifications to the examples given can be made without departing from the scope of the invention as claimed. For instance, in some examples, the apparatus 1 may comprise a plurality of touch pads 15. For example, a first touch pad 15 may be provided in a touch sensitive display 31 and a second touch pad 15 could be provided around the edge of the apparatus 1. The respective touch pad 15 may be configured to have different threshold inputs. The touch sensitive display 31 may be configured to be more sensitive to enable a user to make precision inputs. The touch pad 15 around the edge of the apparatus 1 may be less sensitive so it may have a higher threshold input for registering user actuation. The touch pad 15 around the edge of the apparatus 1 may be used for detecting when the user is holding or gripping the apparatus. When the apparatus 1 detects that a cover 25 is in place the apparatus 1 may be configured to change the threshold input for each of the plurality of touch pads 15.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   determining that a cover is positioned overlaying a capacitive touch pad;
   adjusting, in response to the determining, a threshold input at which user actuation of the capacitive touch pad is registered, where the threshold input is lowered, where a signal from the capacitive touch pad below the threshold input is ignored;
   detecting at least one reference actuation of the capacitive touch pad;
   determining the threshold input for when the cover is positioned overlaying the capacitive touch pad based, at least partially, upon the detecting of the at least one reference actuation; and
   storing data regarding the determined threshold input in the cover.

2. A method as claimed in claim 1 wherein the cover is a temporary cover.

3. A method as claimed in claim 1 wherein the cover is configured to be removably positioned overlaying the capacitive touch pad by a user.

4. A method as claimed in claim 1 wherein determining that a cover is positioned overlaying a capacitive touch pad comprises receiving a data communication from the cover.

5. A method as claimed in claim 4 wherein the data communication is obtained via at least one of a wireless connection, a near field communication connection, a physical connection.

6. A method as claimed in claim 1 wherein determining that a cover is positioned overlaying a capacitive touch pad comprises detecting inputs within a predetermined range.

7. A method as claimed in claim 1 wherein adjusting the threshold input comprises changing a threshold capacitance from a first capacitance to a second capacitance where the second capacitance is lower than the first capacitance.

8. A method as claimed in claim 7 wherein the second capacitance is determined using at least one of, calibration measurements, data transmitted from the cover.

9. A method as claimed in claim 1 wherein the cover forms a protective casing around an apparatus.

10. A method as claimed in claim 1 comprising determining that the cover has been removed from the position overlaying the capacitive touch pad and adjusting, in response to determining that the cover has been removed, the threshold-input back to the threshold which was used before the cover was attached.

11. A method as claimed in claim 1 wherein the cover overlays a plurality of capacitive touch pads and the threshold input is adjusted individually for each of the plurality of capacitive touch pads.

12. A method as in claim 1 further comprising receiving the data from the cover by an apparatus comprising the capacitive touch pad.

13. A method as in claim 1 further comprising storing data regarding the determined threshold input in an apparatus comprising the capacitive touch pad.

14. An apparatus comprising:
at least one processor; and
at least one memory including computer program code;
the at least one memory and the computer program code configured to, with the at least one processor, cause the apparatus at least to perform:
determining that a cover is positioned overlaying a capacitive touch pad;
adjusting, in response to the determining, a threshold input at which user actuation of the capacitive touch pad is registered, where the threshold input is lowered, where a signal from the capacitive touch pad below the threshold input is ignored;
detecting at least one reference actuation of the capacitive touch pad;
determining the threshold input for when the cover is positioned overlaying the capacitive touch pad based, at least partially, upon the detecting of the at least one reference actuation; and
storing data regarding the determined threshold input in the cover.

15. An apparatus as claimed in claim 14 wherein the cover is a temporary cover.

16. An apparatus as claimed in claim 14 wherein the apparatus is configured to enable the cover to be removably positioned overlaying the capacitive touch pad by a user.

17. An apparatus as claimed in claim 14 wherein the at least one memory and the computer program code are configured to, with the at least one processor, cause the apparatus to determine that a cover is positioned overlaying a capacitive touch pad by receiving a data communication from the cover.

18. An apparatus as claimed in claim 17 wherein the apparatus is configured to obtain the data communication via a wireless connection.

19. An apparatus as claimed in claim 14 wherein the at least one memory and the computer program code are configured to, with the at least one processor, cause the apparatus to determine that a cover is positioned overlaying a capacitive touch pad by detecting inputs within a predetermined range.

20. An apparatus as claimed in claim 14 wherein the at least one memory and the computer program code are configured to, with the at least one processor, cause the apparatus to determine that the cover has been removed from the position overlaying the capacitive touch pad and adjust, in response to determining that the cover has been removed, the threshold input back to the threshold which was used before the cover was attached.

21. An apparatus as claimed in claim 14 wherein the cover overlays a plurality of capacitive touch pads and the threshold input is adjusted individually for each of the plurality of capacitive touch pads.

22. A non-transitory program storage device, tangibly embodying a program of instructions that, when executed by at least one processor, enable:
determining that a cover is positioned overlaying a capacitive touch pad;
adjusting, in response to the determining, a threshold input at which user actuation of the capacitive touch pad is registered, where the threshold input is lowered, where a signal from the capacitive touch pad below the threshold input is ignored;
detecting at least one reference actuation of the capacitive touch pad;
determining the threshold input for when the cover is positioned overlaying the capacitive touch pad based, at least partially, upon the detecting of the at least one reference actuation; and
storing data regarding the determined threshold input in the cover.

\* \* \* \* \*